US011365998B2

(12) United States Patent
Wohlgenannt

(10) Patent No.: US 11,365,998 B2
(45) Date of Patent: Jun. 21, 2022

(54) DOSING DEVICE FOR A LIQUID SUPPLY WITH NECK

(71) Applicant: Capartis AG, Schaffhausen (CH)

(72) Inventor: Herbert Wohlgenannt, Schaffhausen (CH)

(73) Assignee: CAPARTIS AG, Schaffhausen (CH)

( * ) Notice: Subject to any disclaimer, the term of this patent is extended or adjusted under 35 U.S.C. 154(b) by 163 days.

(21) Appl. No.: 16/614,712

(22) PCT Filed: May 18, 2018

(86) PCT No.: PCT/EP2018/063227
§ 371 (c)(1),
(2) Date: Nov. 18, 2019

(87) PCT Pub. No.: WO2018/211125
PCT Pub. Date: Nov. 22, 2018

(65) Prior Publication Data
US 2021/0278264 A1  Sep. 9, 2021

(30) Foreign Application Priority Data
May 19, 2017  (EP) .................................... 17172085

(51) Int. Cl.
*G01F 11/06*  (2006.01)
(52) U.S. Cl.
CPC .................................. *G01F 11/06* (2013.01)
(58) Field of Classification Search
CPC ........ G01F 11/04; G01F 11/06; G01F 11/021; G01F 11/268
See application file for complete search history.

(56) References Cited

U.S. PATENT DOCUMENTS 3,029,847 A * 4/1962 Heiss .................. B01F 15/0237
141/104
4,781,312 A * 11/1988 Strazdins ................. A47K 5/12
222/309

(Continued)

FOREIGN PATENT DOCUMENTS

GB          751165 A        6/1956
WO      2015/150250 A1     10/2015

OTHER PUBLICATIONS

International Search Report issued in connection with PCT/EP2018/063227 dated Oct. 2, 2018.

*Primary Examiner* — J C Jacyna
(74) *Attorney, Agent, or Firm* — Steven M. Shape

(57) ABSTRACT

The dosing device is intended for a neck for pouring defined amounts from a container or hose. It consists of a spout attachment that can be screwed or pushed onto the neck, and that optionally can be closed by a separate lid and has a dosing control chamber (14) with variable volume. As a characterizing feature, this chamber fills up from empty when pouring. Said chamber is formed by the space between a control chamber limiter and the interior of a dosing piston (10) and is filled with liquid when pouring a dose, while liquid at (D1) flows down past the dosing piston (10) to the spout (3). Finally, the downwardly displaced dosing piston (10) closes the spout (3) when the control chamber (14) is full. The dose quantities to be poured are adjustable in that the path of the dosing piston (10) can be limited on its side facing the container or hose. The control chamber limiter is variably displaceable axially with respect to the dosing device into the equipped neck and can be held fixedly in any position.

11 Claims, 11 Drawing Sheets

(56) References Cited

U.S. PATENT DOCUMENTS

| | | | | |
|---|---|---|---|---|
| 5,280,846 A | * | 1/1994 | Lonnecker | G01F 11/261 |
| | | | | 222/41 |
| 5,305,923 A | * | 4/1994 | Kirschner | B67D 1/0021 |
| | | | | 222/129.1 |
| 2017/0029177 A1 | * | 2/2017 | Holroyd | G01F 11/262 |
| 2017/0176231 A1 | * | 6/2017 | Wohlgenannt | G01F 11/021 |
| 2018/0113017 A1 | * | 4/2018 | Hoefte | G01F 11/06 |

* cited by examiner

DOSING DEVICE FOR A LIQUID SUPPLY WITH NECK

CROSS-REFERENCE TO RELATED APPLICATIONS

This is a 35 U.S.C. 371 National Stage Patent Application of International Application No. PCT/EP2018/063227, filed May 18, 2018, which claims priority to European application 20170172085, filed May 19, 2017, each of which is hereby incorporated by reference in its entirety.

BACKGROUND

The invention relates to a dosing device for dispensing a liquid supply, be it from a container with neck, for example from a plastic or PET bottle or from a hose with neck, in dosed portions.

Dosing caps or devices for dosed dispensing of liquids are known in several designs. A very well-developed dosing closure is known from WO 2015/150250 A1, published by the same applicant on 8 Oct. 2015. It is intended for a neck for dispensing defined doses from a container or hose and consists of a spout attachment which can be screwed or pushed onto the neck and can optionally be closed with a separate lid. A closure body is held thereon, which contains a moveable dosing means for dispensing a certain dose per dispensing cycle. As a characterizing feature, the dosing means forms a dosing control chamber with variable volume, wherein this dosing control chamber is not emptied from full to empty during the pouring of a dose, but rather is filled from empty to full. This dosing control chamber is bounded by two stationary and two displaceable walls, wherein two mutually parallel, arbitrarily shaped, side walls axially extending to the neck are present on the closure body, one of which is displaceably mounted relative to the other in the axial direction to the neck on the closure body. The stationary side wall on the closure body forms, at its end facing the container, a base wall projecting from it at an angle and connecting to the opposite movable side wall. The movable side wall on the other hand, at its end facing the mouth of the container neck, forms a top wall projecting towards it at an angle and in turn connecting to the stationary side wall. The variable volume enclosed by all four of these walls then forms the dosing control chamber. The following occurs for a dosing cycle in the case of an inverted position of the dosing device: The movable side walls and the movable top wall starting from its uppermost position—in this inverted position—and with filled pouring space below the movable top wall, are initially moved purely axially downward by increasing the effective pressure above the top wall, with filling of the dosing control chamber and simultaneous outflow of liquid from the space below the dosing piston, which is formed by the movable side wall and its top wall, and pushes into the pouring space during pouring. This occurs until the moving parts close the pouring hole, wherein the pouring hole is sealingly covered by the top wall. Thereafter, the pressure is reduced again above the top wall, and this moves back upward, with renewed filling of the pouring space due to downward flow around the movable side wall and with simultaneous emptying of the dosing control chamber until the movable parts have reached their initial state and the dosing cycle is thus completed. The path travelled by the movable walls, that is to say the movable side wall and the top wall projecting therefrom, thereby determines the dosing volume. As soon as this control chamber is filled, the outflow from the dosing closure stops. However, the same dose is always dispensed.

Indisputably, in this document WO 2015/150250 A1 a variable adjustment of the pouring volume is also mentioned, and a variant for implementation is also disclosed. For this purpose, a limiter 6 with its helical web 28 is provided, as can be seen in FIG. 15. In this figure, the rotary body 2 otherwise connected in one piece with the limiter 6 is omitted. Therefore one can see in this figure the two stop cams 26, 27 for limiting the rotational range of the rotary body 2. If the limiter 6 with the rotary body 2 is rotated relative to the device body 1, this causes a stepless adjustment of the dosing quantity between a minimum and a maximum. FIG. 16 then shows the dosing device for this stepless adjustment of the dosing quantity seen from below, with a setting for a minimum dosing quantity. The rotary body 2 has here been rotated clockwise until the cam 24 struck on the stop cam 27. The limiter 6 is then positioned so that the extension 11 on the dosing piston 10 can travel only a minimum distance upwards. Conversely, FIG. 17 shows the dosing device for stepless adjustment of the dosing amount seen from below, with the setting for the maximum dosing quantity. The rotary body 2 was here rotated counterclockwise in the closure body 1 until its cam 24 on the stop cam 26 found a stop. In this case, the limiter 6 on the upper side of the dosing device is in a position such that the extension 11 on the dosing piston 10 can travel a maximum path. It is clear that all intermediate positions between the two stop cams 26, 27 are adjustable. FIGS. 31 to 35 show a very special embodiment of this dosing closure, in each case in a partial section, in order to uncover the view into the interior. This allows a continuous adjustment of the dosing volume or the volume of the dosing control chamber between a minimum and a maximum, and also the setting of intermediate positions in which the dosing closure ensures free outflow without dosing.

Furthermore, a liquid and granulate dispenser is known from U.S. Pat. No. 5,280,846 A. This has a spindle with a container for the realization of an apportioning principle. This container is filled by inversion and is emptied upon turning again through 180 degrees, dispensing one portion, and in each case only as much as the container can contain. A liquid and granulate dispenser according to U.S. Pat. No. 5,280,846 A never pours or spills out more than this container acting as a dosing chamber contains. The spindle merely adjusts this relatively small dosing chamber. In addition, the spindle engages directly into the element to be controlled and makes the sealing of the plate in the dosing and measuring cup difficult.

It is the task of the present invention, proceeding from the above solutions and in particular proceeding from WO 2015/150250 A1 and the dosing closure disclosed in detail therein, as well as in consideration of the solution according to U.S. Pat. No. 5,280,846 A, to create a dosing closure which provides a continuously variable dosing volume. This change in the dosing volume should be easily adjustable and the dosing volume should be scalable, with display of the different volumes in a scale on the dosing closure. The basic properties of the already known dosing closure according to WO 2015/150250 A1 should be maintained. This means that even this further developed dosing closure should manage with a minimum number of simple spraying parts with no spring elements, and that these parts are extremely easy to assemble, further that its application is foolproof, that the dosing closure does not clog and a set dosage may be reliably poured by simple tilting into a pouring position or by inversion and slight squeezing of the container. Similarly, pouring from a bellows associated with a hose is to be made possible, from which the liquid is supplied. The dosing of any adjustable volumes should be just as reliable, whether the container is completely full, half full or almost empty. The dosing quantity should be continuously adjustable between a minimum and a maximum, wherein the maximum should be far greater than the entire volume of the complete dosing closure. In another setting, the closure should not pour any medium at all, thus kept tight, and in a still further setting, it should enable continuous undosed pouring. Finally, this dosing closure, at comparatively large dispensed doses, should be much lighter, about half as heavy as that according to WO 2015/150250 A1 and furthermore, this dosing closure should be much cheaper to produce than the known solutions.

This object is achieved by a dosing device for a neck for pouring of defined doses from a container or hose, consisting of a spout attachment which can be screwed or pushed onto the neck, and optionally can be closed with a separate lid, with a dosing control chamber of variable volume that is filled from empty to full during pouring, wherein this dosing control chamber is formed by the space between a control chamber limiter and the interior of a dosing piston, which fills up during pouring of a dose, wherein the dosing piston closes the spout when the control chamber is full, and which is characterized in that dose quantities to be poured are adjustable in that the path of the dosing piston, on its side facing the container or hose, can be limited, in that a spindle is rotatably mounted in the dosing device in an axial spindle socket and has a rotary knob on the top, which sealingly protrudes at the front from the dosing device, and that the spindle engages with its thread with its end region in the threaded sections inside an adjustment sleeve and the adjustment sleeve is connected on the outside with a control chamber limiter for the dosing piston, so that upon rotation of the spindle, the control chamber limiter is axially displaceable in its position and thus the position for starting the pouring of a dose in each setting position can be limited so that the path of the dosing piston and thus the filling volume of the control chamber can be selected.

In comparison with WO 2015/150250 A1 the newly claimed mechanism with spindle and bar is much cheaper to produce and thus a much greater range of dosing quantities can be realized. The complexity of the system is reduced very significantly and this makes this dosing closure even more reliable and accurate. The solution with a rotary knob with arrows for marking the dosages is hereby intuitively understandable and clearer. This solution with a spindle as claimed is not even half as heavy as the adjustment principle according to WO 2015/150250 A1! As a characterizing feature, the content of the control chamber itself is not poured out, which has the advantage that the pouring dose can be a multiple of the content of the control chamber. Thus doses can be dispensed that are many times larger than the entire volume of the closure, which no prior closure permitted. This very sophisticated, specific way of implementing continuous adjustability with a spindle/bar is not known in the prior art. The spindle, which may even be hollow, is used to change the small control chamber and therefore to adjust the pouring dose up to a multiple of the volume of the entire closure.

A spindle may be known in principle, but acting in accordance with U.S. Pat. No. 5,280,846 A it would make the present system inoperable because the moving part of the system-typical chair would find no place and, besides which, it would itself make the pouring impossible. U.S. Pat. No. 5,280,846 A represents a completely different principle, which is hardly comparable with the present one, because with the present system it is not necessary to first fill a dosing chamber each time, which is then simply emptied, whereby the maximum dosing quantity corresponds to the volume of the dosing chamber.

BRIEF DESCRIPTION OF THE DRAWINGS

Various embodiments of this dosing device and the parts of this dosing device for a neck for pouring of defined doses from a container or hose according to claim 1 will be described below with reference to the drawings, and the function of these parts and operation of these dosing devices, and in particular the mechanism for setting the dosing quantity, are expounded and explained in detail.

The drawing shows.

DETAILED DESCRIPTION OF THE DRAWINGS

Figure 1:
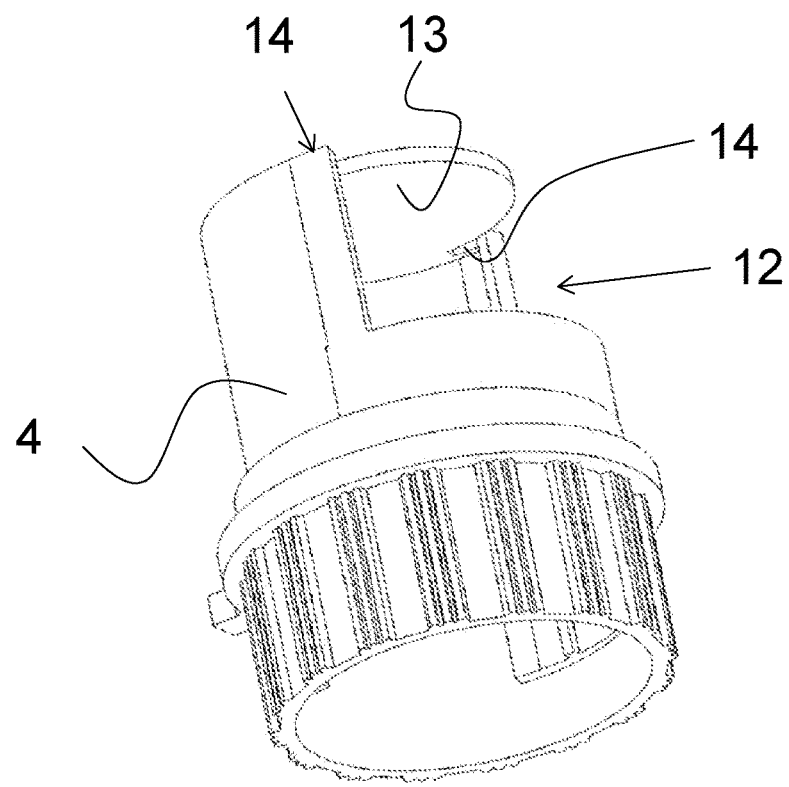
FIG. 1: The first stationary part of the dosing means, namely the cup with window.

First, the general and very special action of the dosing will be shown, as it is the subject matter of WO 2015/150250 A1. FIG. 1 shows the first, stationary component of the dosing means, namely the hollow cylindrical cup 4 with lateral window 12. In essence, it is merely a hollow cylinder, which is thus closed at the top with a lid 13, wherein this lid 13 is flat in the example shown, but may also have a shape deviating from the planar. Its window 12 is recessed at the upper end in the peripheral wall and extends here by half of the circumference. The lid 13 is shortened in radius at its edge in the outer edge region, which extends along the upper window edge, by the wall thickness of the peripheral wall. Its outer, slightly inwardly offset edge then extends on both sides by somewhat further than half the circumference, so that on both sides of the window 12, incisions 14 are formed in the lid 13. On its inside, guide ribs are formed in the hollow cylinder of the cup 4 and extend in the axial direction.

Figure 2:
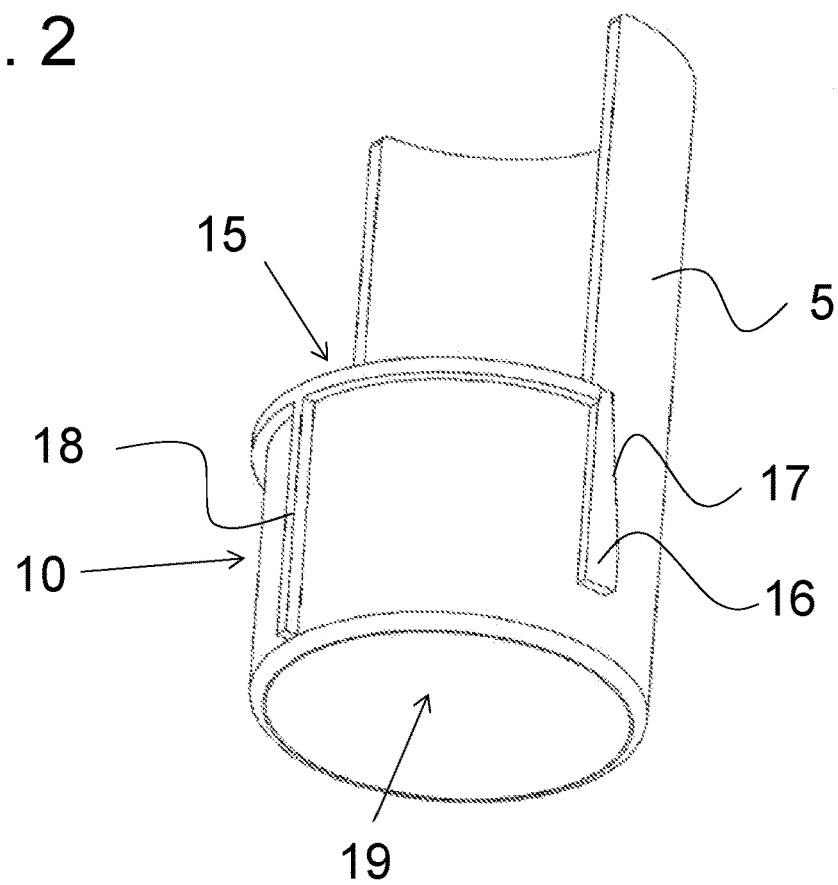
FIG. 2: The second movable part of the dosing means, namely the dosing piston with extension.

The second movable component of the dosing means, namely a dosing piston 10 with extension 5 as shown in FIG. 2, can be inserted in the hollow cylindrical cup of FIG. 1. This dosing piston 10 forms a sort of chair which is covered with a cover. In the lower part, it forms a hollow cylinder 19, which is open at the bottom, and its outer wall extends upward beyond the upper end face 15 of the hollow cylinder 19 and forms an extension 5 in the form of a free-standing segment of a peripheral wall. This extension 5 extends here by about half the circumference of the hollow cylinder 19 or dosing piston 10. It can also extend over an angular segment of 90° to 200° in the axial direction to the dosing piston 10. To stay with the graphic comparison to a chair, this extension 5 forms the chair back, so to speak. On the outside of the dosing piston 10 there is a wedge-shaped rib 16 on both sides with an oblique surface 17, which therefore runs at a slight oblique angle to the axial direction of the hollow cylinder or dosing piston 10. In the example shown, there is also an axial rib 18 on the front of the cup, or on the front of the "chair" formed by it.

Figure 3:
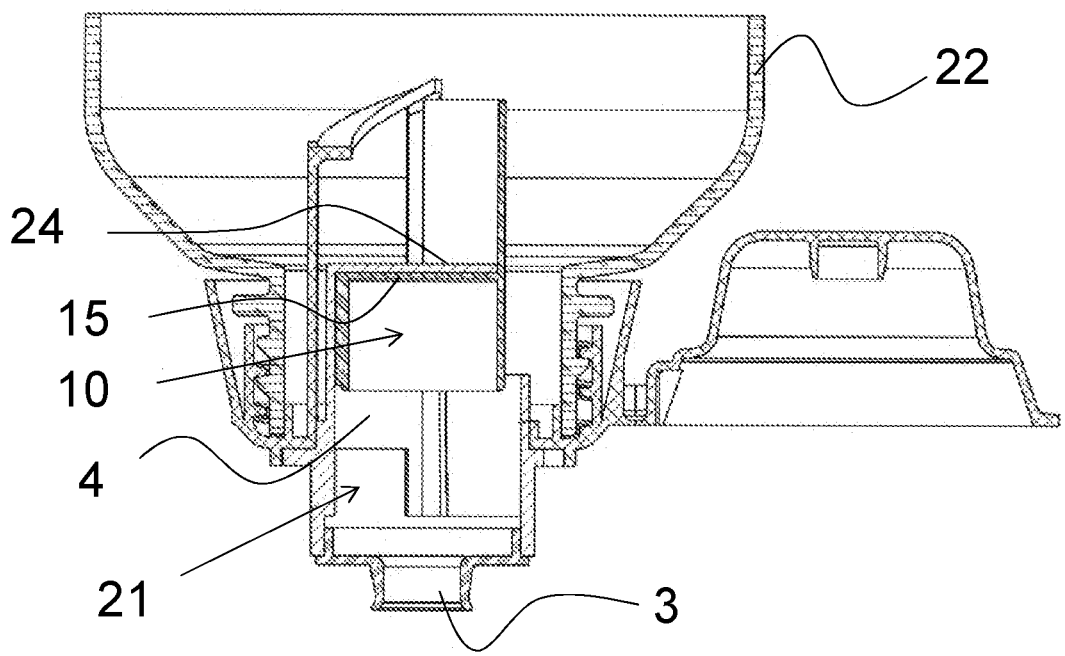
FIG. 3: A dosing device with this dosing means, shown in an axial section, in an inverted position, with the dosing piston in its uppermost location in the cup, ready to dispense a dose.

Below, the operation of dosing is described step by step and explained. FIG. 3 shows the dosing device or the dosing closure in an axial section, in an inverted position, with the dosing piston 10 in its uppermost position within the cup 4 in this illustration, ready to dispense a dosed portion. In this position, the space 21 has been filled below the dosing piston 10 with liquid from the container 22, with which the dosing closure is equipped. However, it cannot escape because little or no air can flow in through the spout 3 from below. The lack of pressure compensation and the viscosity prevent air penetration and thus also the outflow of liquid through the spout 3. The beginning of the dosing cycle is described from this point, with the position of the dosing piston 10 as shown. Now it is important to pour this dosing portion within and below the dosing piston 10 to the outside. For this purpose, a higher pressure must be generated in the interior of the container 22, or in the case of a hose in the interior of the hose, than that which prevails outside the container, hose, and closure, i.e. a pressure higher than atmospheric pressure. This is done by pressing the container 22 together with one or both hands and thus squeezing it lightly. In the case of a hose for the liquid supply, this can be done by installing a hose valve in the hose at its end region in front of the dosing closure, the valve opening into an elastic compressible bellows, which then opens into a neck, which is finally equipped with the dosing device. The more the container or the bellows is squeezed when the hose valve is closed, the faster the dispensing of the dosing quantity, which in a typical dimensioning of the dosing device has a volume of 2 ml to 90 ml. Of course with different sizing, either enlargement or reduction of the entry hole (12) on the control chamber limiter 31 into the control chamber, the dosing quantity can be made larger or smaller. The liquid is poured through the main channel adjacent to the dosing control chamber until the control chamber is full and the pouring hole is closed.

Figure 4:
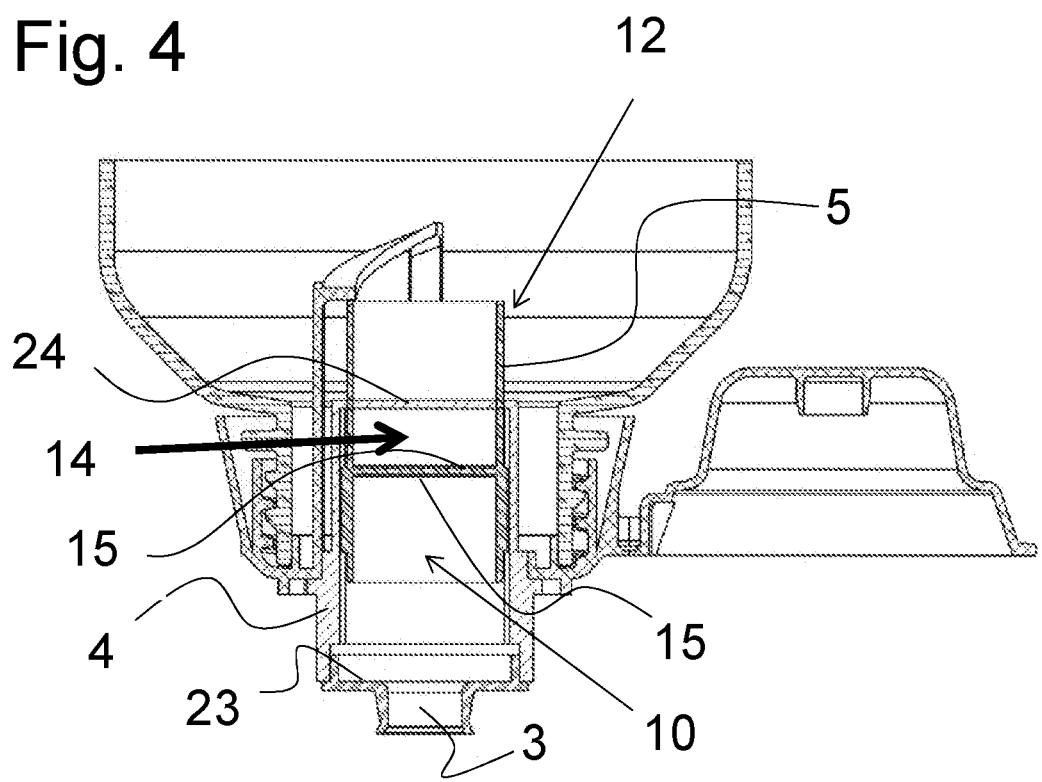
FIG. 4: The dosing device with this dosing means, shown in an axial section, in an inverted position, with the dosing piston on its way down, when dispensing the dose.

The liquid contents of the container 22, upon squeezing of the container or bellows, push from above on the cover 15, thus by analogy on the chair seat surface of the analogous chair that the dosing piston 10 forms. Below the lid 15, there is a lower pressure than above the dosing device because the main channel forms a bottleneck next to the dosing control chamber. Thus, the dosing piston 10 moves downward inside the cup 4 as shown in FIG. 4 and pushes the dosing portion of the liquid enclosed below through the spout 3 to the outside. The space above the lid 15 forms a dosing control chamber 14, which in the state as shown in FIG. 3 initially encloses no volume, but the volume grows continuously due to the downward movement of the dosing piston 10, and at the lowest position of the dosing piston 10 finally reaches a maximum. The space of the dosing control chamber 14 is limited by a total of four walls, namely two stationary and two movable walls. Specifically, there are two mutually parallel side walls extending in the axial direction to the neck, of which one is displaceable relative to the other. One wall is stationary, namely the peripheral wall of the cup 4, while the displaceable side wall is formed by the extension 5. In addition, there are two other boundary walls, namely the bottom 24 of the cup as a stationary boundary wall and the lid 15 of the dosing piston or the seat surface of the analogous chair as a displaceable boundary wall. The bottom 24 or bottom wall projects at an angle from the wall of the cup 4, and the lid 15 projects here at a right angle from the extension 5. The variable volume enclosed by all four walls 15, 5, 4, 24 forms the dosing control chamber 14. When the container is squeezed, the dosing piston is pushed down and the volume of the dosing control chamber increases and is simultaneously filled from above. The dosing device is again shown in FIG. 4 in an axial section, with the dosing piston 10 on its downward path inside the cup 4 during dispensing of the dosing portion. In the position shown, the dosing piston 10 has covered about one fifth of its downward path. The semicircular extension 5 on the dosing piston 10 nestles within the window or inlet hole 12 against the inner wall of the cup 4 and closes the gap approximately in a liquid-tight manner. This pushing down of the dosing piston 10 due to the higher pressure above than on its underside continues until the dosing piston 10 encounters a stop below on the inner edge 23 of the spout 3.

Figure 5:
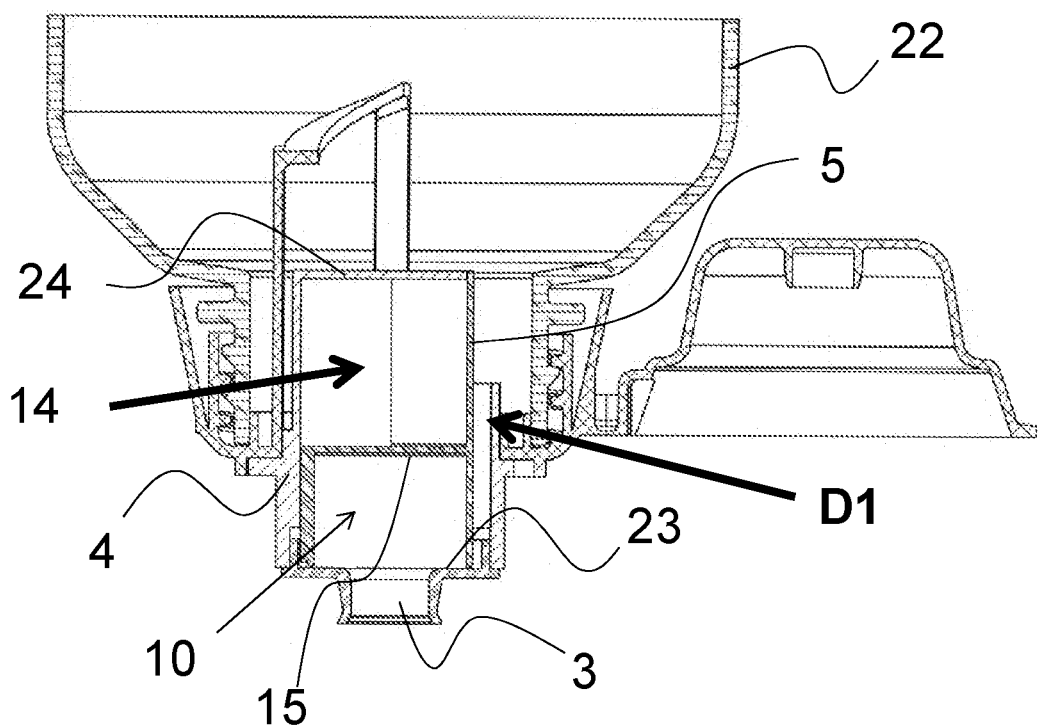
FIG. 5: The dosing device shown with this dosing means in an axial section, in an inverted position, with the dosing piston in its lowest location, after dispensing the dose.

The lowermost end position of the dosing piston 10 is shown in FIG. 5. It shows the dosing device or the dosing closure in an axial section, with the dosing piston 10 in its lowest position, after dispensing the dosing portion. Until just before reaching this position, liquid also flowed out of the container behind the extension 5, thus by analogy behind the chair back, downward from the container through the space behind it. The important distance here between the back of the extension 5, or by analogy the chair back to the inner wall of the hollow cylindrical cup 4, is indicated here with D1. In the position shown, the closure is sealingly closed in that the lower edge of the dosing piston sealingly rests on the edge 23 inside the spout 3 and closes it. The dosing is ultimately effected by the simultaneous outflow of the liquid during the simultaneous filling of the dosing control chamber 14, and the dosed pouring is finally stopped due to closing by a portion of the dosing control chamber 14. In order for the pouring of a dose of liquid to proceed, the dosing control chamber 64, which grows in volume as a result of the downward movement of the dosing piston 10, must be filled from empty to full. In step with this, the dose is dispensed through the spout 3.

Now it is time to prepare a new portion of the liquid for dosed dispensing or to load it into the dosing chamber of the dosing piston 10 from the liquid supply. For dispensing the dose, the container is compressed, or in the case of a supply hose its built-in bellows is compressed until the dosing piston 10 is pressed all the way down and then sealingly closed the container. If the container 22 or bellows is then released, it elastically recovers its shape and thus creates a negative pressure relative to the atmospheric pressure prevailing outside. As a result, there is an excess pressure which acts on the underside of the lid 15 and on the analogous underside of the seat surface of the chair which is formed by the dosing piston 10. But now because the dosing piston 10 inside the cup 4 is intentionally seated with a little play, it immediately yields in the direction of no resistance, and that is in the backward pivoting direction of the analogous chair back.

Figure 6:
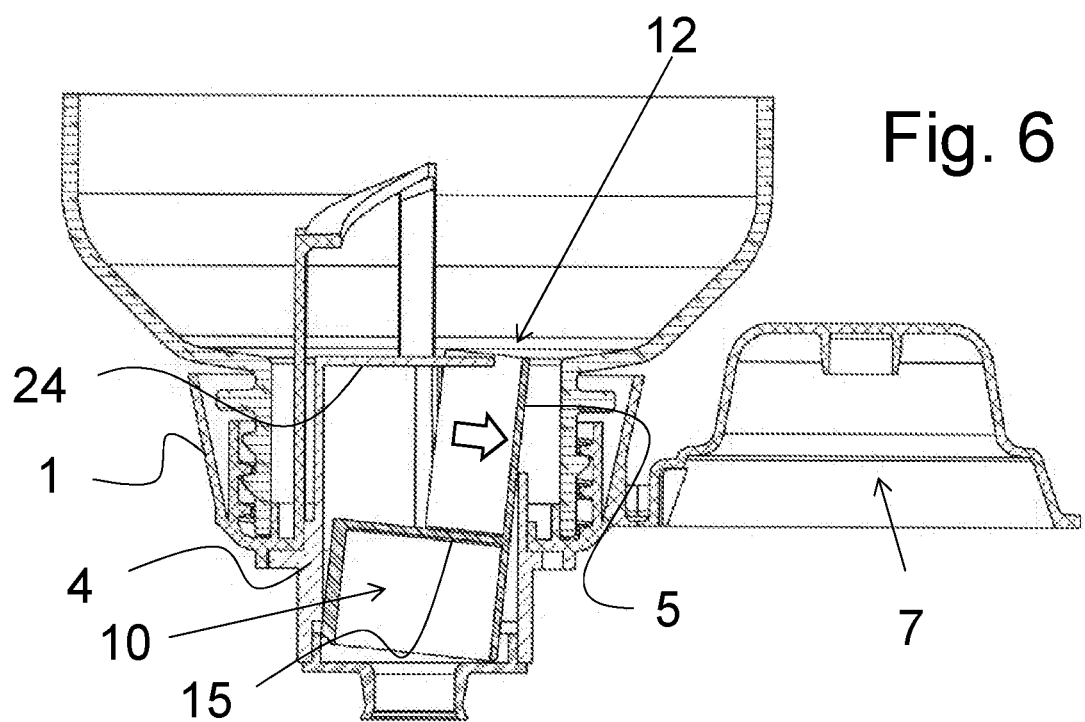
FIG. 6: The dosing device with this dosing means, shown in an axial section, in an inverted position, with the dosing piston in its lowest location, after pressure relief of the container and in consequence of the dosing piston pivoted in the cup due to atmospheric pressure.

Thus the extension 5 inclines slightly outward, as shown by the arrow in FIG. 6. This movement or lateral inclination of the dosing piston 10 causes it to act together with the cup 4 as a valve. Thus it not only performs a pure function as a piston and device for varying the dosing-control chamber volume, but also performs a valve function. Due to the gaps arising as a result of the deliberately chosen play and by their broadening due to the inclination of the dosing piston 10 in the hollow cylindrical cup 4, air can flow from below through these gaps up into the interior of the container 22 or bellows and ventilate it. Liquid flows in the same volume from the container 22, or in the case of a hose from its elastic bellows, through the gaps between the cup 4 and dosing piston 10 down into the dosing chamber. This initial position for filling the dosing chamber is shown in FIG. 6. It shows the dosing closure in an axial section, with the dosing piston 10 in its lowest position, after pressure relief of the container 22 and subsequently with the dosing piston 10 pivoted due to the atmospheric pressure in the interior of the cup 4. Given a persistent and prevailing pressure difference, however, the dosing piston 10 now moves upward in the hollow cylindrical cup 4 from this position, because the prevailing atmospheric pressure below its lid 15 is greater than the prevailing pressure due to the elastic recovery of the container 22 or bellows in its interior and thus above the lid 15. The upward movement of the dosing piston 10 continues until its lid surface 15 strikes inside the bottom 24 of the hollow cylindrical cup 4. Its extension 5 has thereby been displaced upward over and through the window or inlet hole 12 on the cup 4 and now surmounts the cup 4 in the container interior, or in the case of a hose, protrudes into the hose neck.

Figure 7:
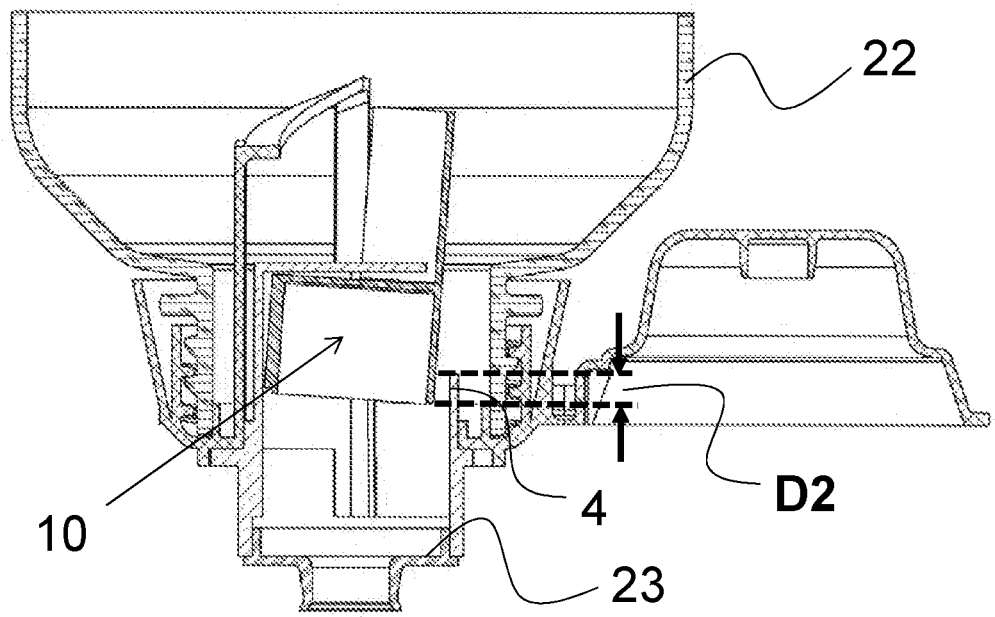
FIG. 7: The dosing device with this dosing means, shown in an axial section, in an inverted position, with the dosing piston in its uppermost location, after ventilation of the container and reduction of the pivoting due to the geometric design of the parts.

The finally assumed end position is shown in FIG. 7. It shows the dosing device or the dosing closure in an axial section, with the dosing piston 10 in its uppermost position, after ventilation of the container 22 or hose bellows. In the course of the upward movement of the dosing piston 10 its inclination relative to the container axis was continuously reduced. The inclination of the dosing piston 10 is therefore smaller in this end position relative to the initial inclination. In the end position shown here there is an overlap of the height of the lower edge of the dosing piston 10 on the side of its extension 5 with the upper edge of the hollow cylindrical cup 3 by a certain distance, which is indicated here in FIG. 11 with D2. So that the inclination of the dosing piston 10 is reduced in the upper region of its path and finally limited in the end position, so that the end position is set, ribs 18, 17 are mounted on at least one outer side of the dosing piston 10, which are visible in FIG. 5, and which act as guides. During the entire upward movement of the dosing piston 10, in counteraction to ventilation of the container contents, liquid from the same can run through the gaps around the dosing piston 10 into the region below it and fill this space. As soon as there is again pressure on the outer walls of the container 22 or the bellows, its internal pressure again increases above the atmospheric pressure. Again, the dosing piston 10 now acts as a valve and closes the gaps through which the liquid from the container 22 or bellows could previously run into the dosing space. The same effect occurs when the dosing device is pivoted upwards. For example, by standing up a bottle on which the dosing device is mounted. The effect in this case is caused by gravity instead of negative pressure.

Figure 9:
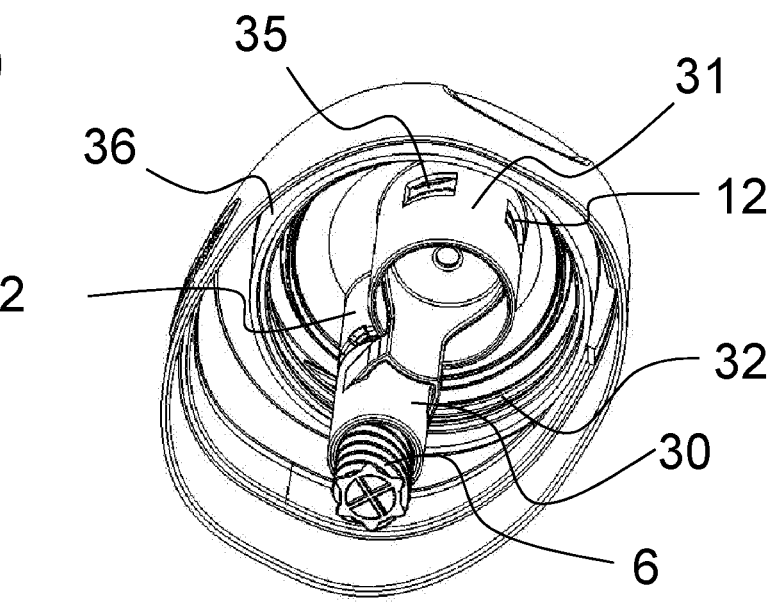
FIG. 9: The dosing device according to FIG. 8 in a view from below.

In summary, therefore, proceeding from the lowermost position of the dosing piston 10 and with a container 22 or bellows squeezed together as shown in FIG. 9, the dosing piston 10 is first forced to pivot away due to releasing of the container or bellows and thus producing a negative pressure relative to the atmospheric, to the position according to FIG. 6, and then to rise because a higher pressure acts below it than above it. During this movement, liquid flows through the resulting gaps into the dosing chamber, but is held there due to the pressure conditions. As soon as the dosing piston 10 with its lid 15 strikes the top of the cup, as shown in FIG. 7, the dosing chamber is maximally filled. Now pressure can again be built up in the container 22 or bellows by squeezing. This leads to the alignment of the dosing piston 10 on the axis of the cup 4 and subsequently to lowering of the dosing piston 10 and to dispensing of the liquid portion previously trapped under its lid 15.

The previously presented components may be differently shaped and dimensioned and each component may if necessary also be composed of several parts, although one advantage of this dosing device, even in its embodiment as a dosing closure, is the fact that may be produced from just these two components, namely the cup 4 and the dosing piston 10.

Essentially, in the special embodiment presented below, it is solely a matter of the manner by which a dosing device such as that described and explained above, the dosing quantity is adjustable. For this purpose, FIG. 8 first shows the top view of a dosing device, which doses according to this principle, but with a special dosing device for selectable dosing quantities. The spout 3 is seen with its beak 25. Approximately at the centre of the dosing device, which can be screwed or pushed onto a container neck as a lid, one sees a hollow rotary knob 8, which is formed on top of a hollow spindle 6, which is seen here protruding from the bottom of the dosing device. On the periphery around the rotary knob 8 a number scale 26 is shown, which here goes from 1 to 9. On the rotary knob 8, a pointer 27 is formed, which here points to number 1. The rotary knob 8 can be rotated clockwise from the position shown to the digit 9, whereby the spindle 6, on whose upper end it sits, is rotated accordingly. The stops 28 act as limiters for the pointer 27.

Figure 8:
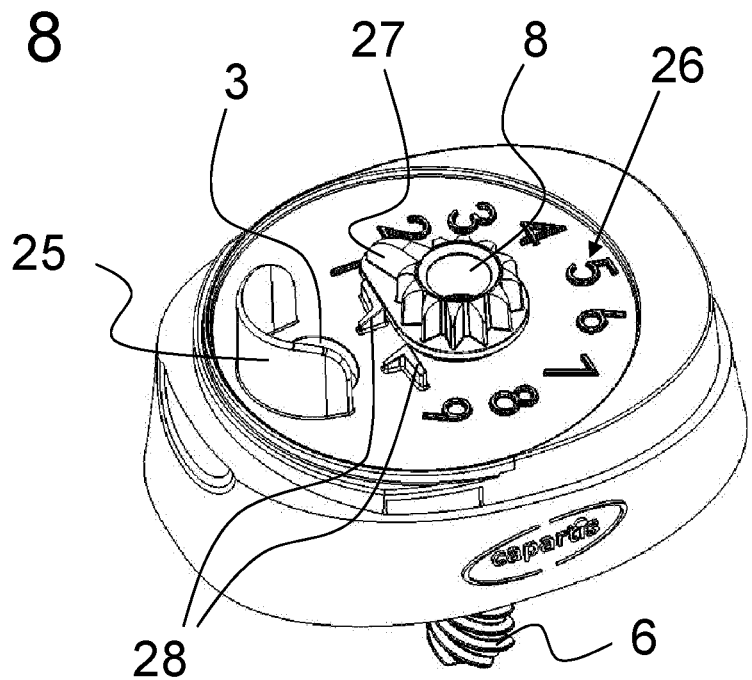
FIG. 8: A view of a dosing device dosing according to this principle, with a dosing device for selectable dose quantities, seen from above.

FIG. 9 shows this dosing device according to FIG. 8 seen in a view from below. As can be seen here, the spindle 6 sits in a threadless socket 2, in which it is rotatably mounted. Further down, the spindle 6 is enclosed in an adjustment sleeve 30 with female thread. Outside of this adjustment sleeve 30, a tube is formed, which includes same for forming the control chamber, so that it is a control chamber limiter 31. Further, side windows 35 can be seen in this control chamber tube 31. And finally, the sleeve 36 is shown with its female thread 32, by means of which the dosing device with this sleeve 36 can be screwed onto the screw neck of a container or a bottle.

Figure 10:
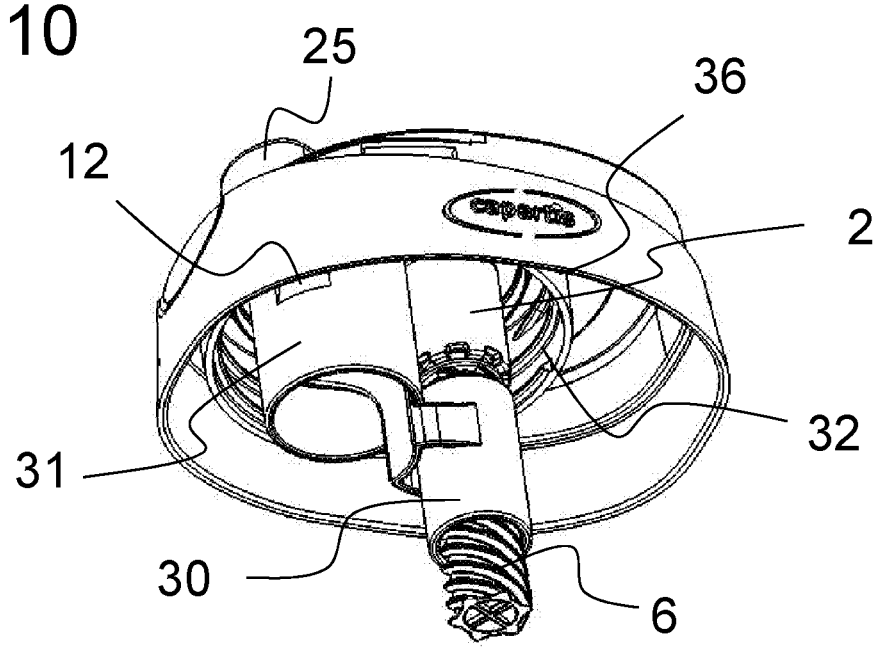
FIG. 10: The dosing device according to FIGS. 8 and 9 viewed obliquely from below.
Figure 11:
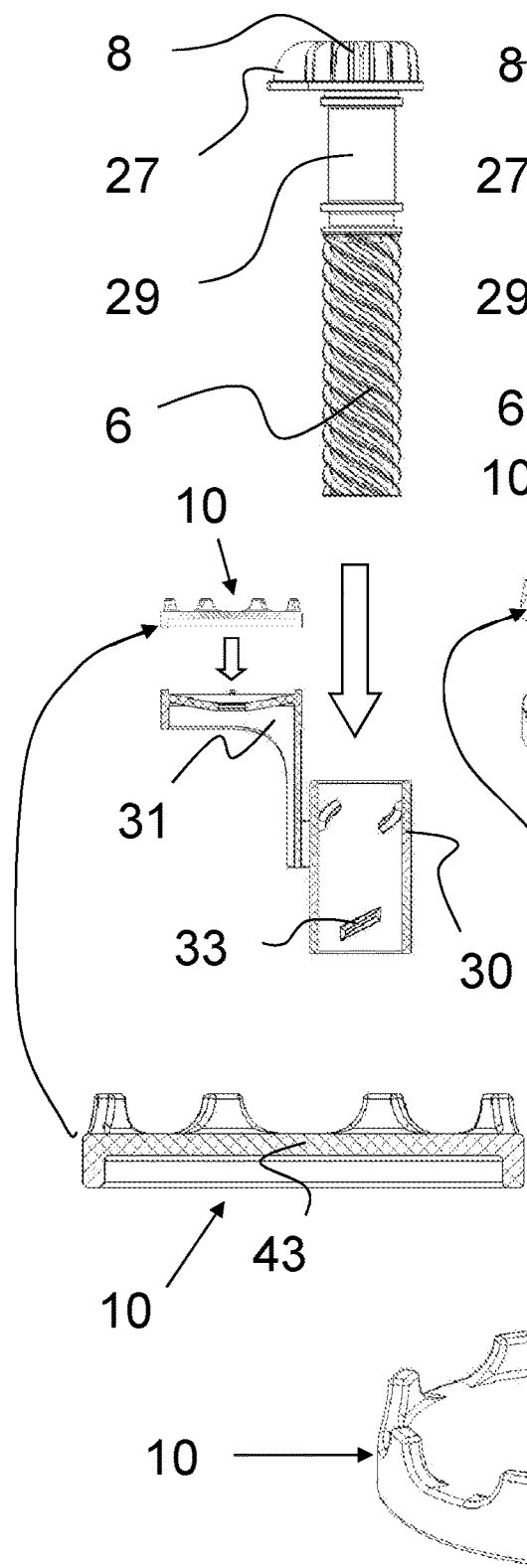
FIG. 11: The parts for adjusting the dosage seen from the side, partially shown in a section.
Figure 12:
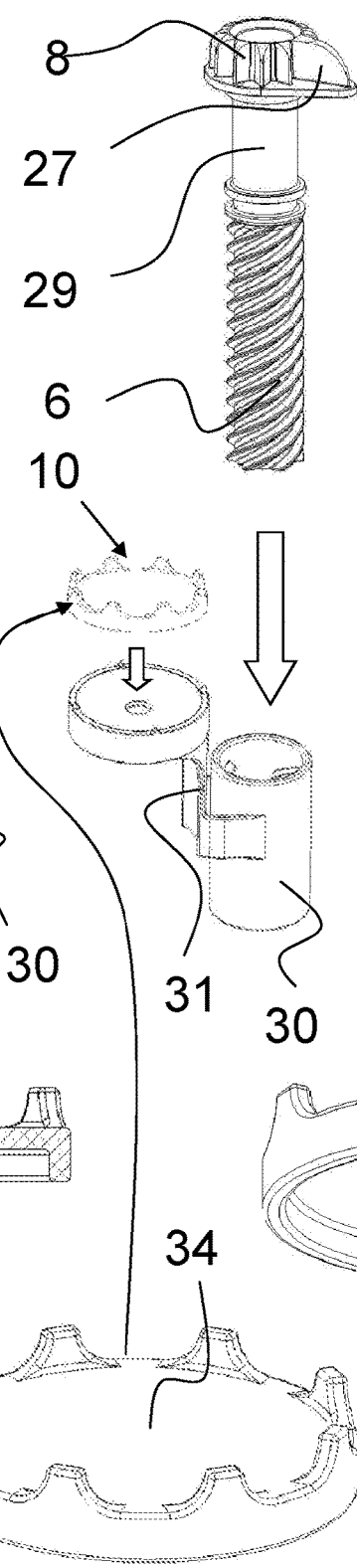
FIG. 12: The parts for the adjustment of the dosage shown obliquely from above.
Figure 13:
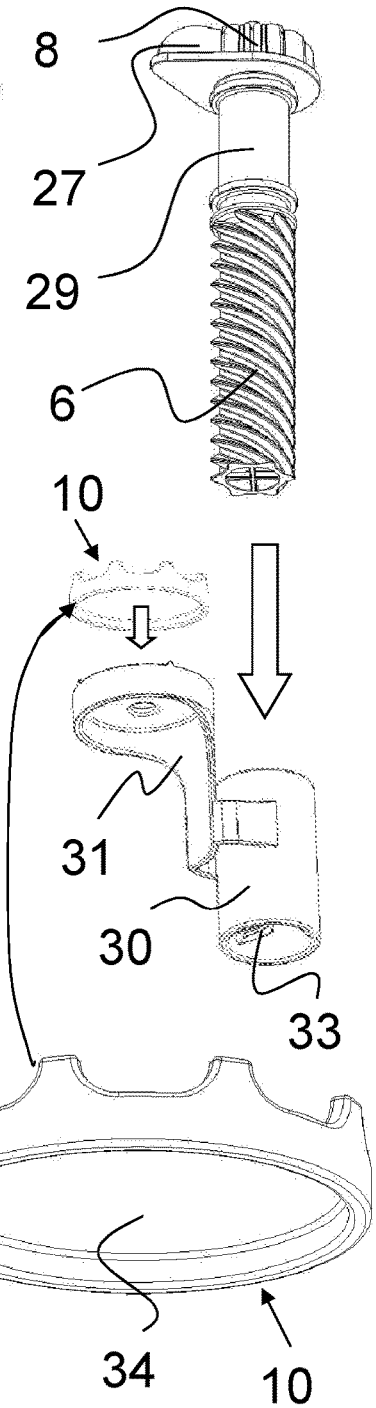
FIG. 13: The parts for the adjustment of the dosage shown obliquely from below.

FIG. 10 shows this dosing device viewed obliquely from a different perspective, with all the parts already described above, with the addition of the beak 25 of the spout. In FIGS. 11 to 13, the spindle 6 is shown with its rotary knob 8 and pointer 27, and below that each of the parts interacting with the spindle 6 in three views, namely in FIG. 11 down to the page edge seen from the side, wherein the parts are shown in section, then in FIG. 12 down to the page edge, all parts in an oblique view from above, and finally in FIG. 13 down to the page edge in an oblique view from below. The spindle 6 has a bare portion 29, with which it can be rotatably supported and held in a socket 2 as shown in FIGS. 9 and 10. The spindle 6 is enclosed with its steep thread in an adjustment sleeve 30, on the inner wall of which some threaded sections 33 are formed, which engage in the spindle thread when the spindle 6 is screwed into this adjustment sleeve 30. On the outside of the adjustment sleeve 30, a control chamber limiter 31 is formed, above which the dosing piston 10 is arranged. Here this has the shape of a crown, but below the crown prongs has a through disc 34, which is shown in the enlarged illustrations at the bottom. This dosing piston 10 acts in the same way as that already described above.

Figure 14:
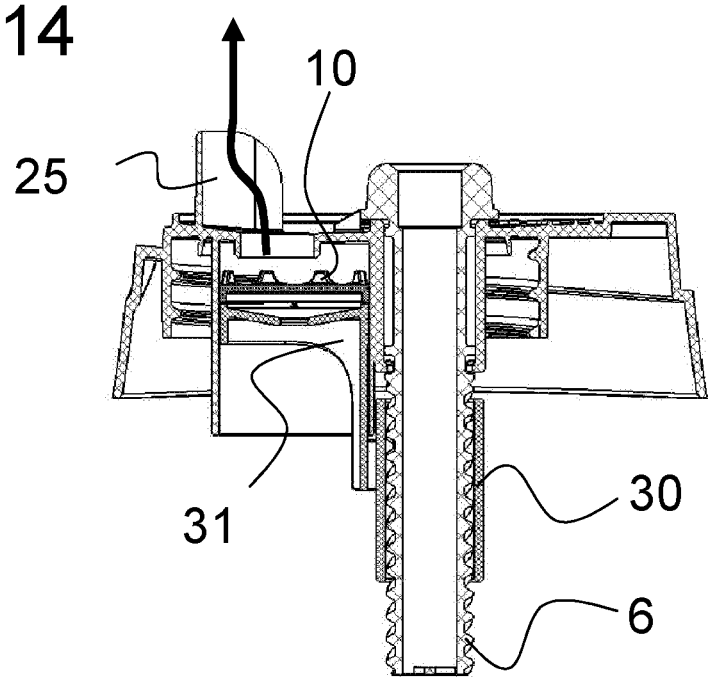
FIG. 14: The assembled dosing device with device for adjusting the dosing quantities shown in a section seen from the side, when setting a minimum dose.
Figure 15:
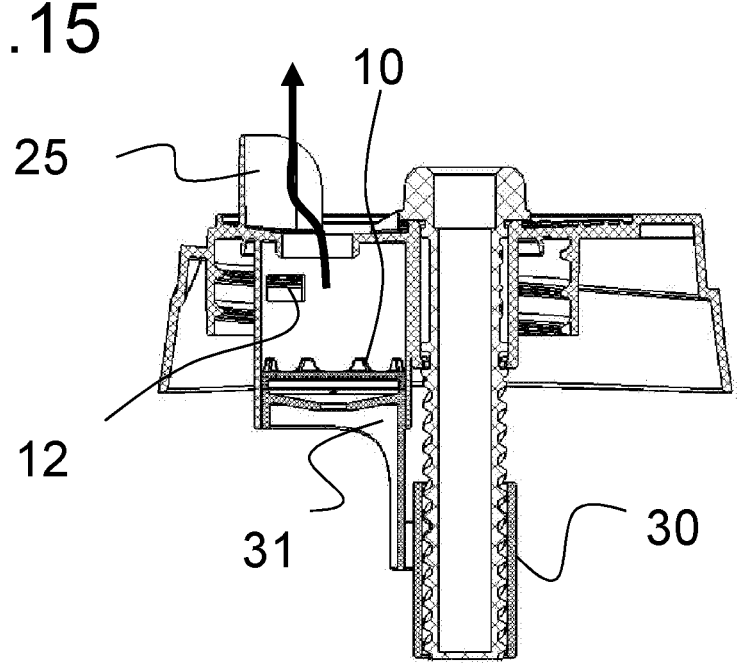
FIG. 15: The assembled dosing device with device for adjusting the dosing quantities shown in a section seen from the side, when setting a maximum dose.

In FIG. 14, this dosing device is shown in assembled condition with the device for adjusting the dosing quantities in a section from the side, with setting of a minimum dose. As can be seen, the spindle 6 has been rotated so far that the adjustment sleeve 30 is moved to its uppermost position and with it the control chamber limiter 31. In FIG. 15 then the assembled dosing device is shown with the device for adjusting the dosing quantities in a section seen from the side, with setting of a maximum dose.

Figure 16:
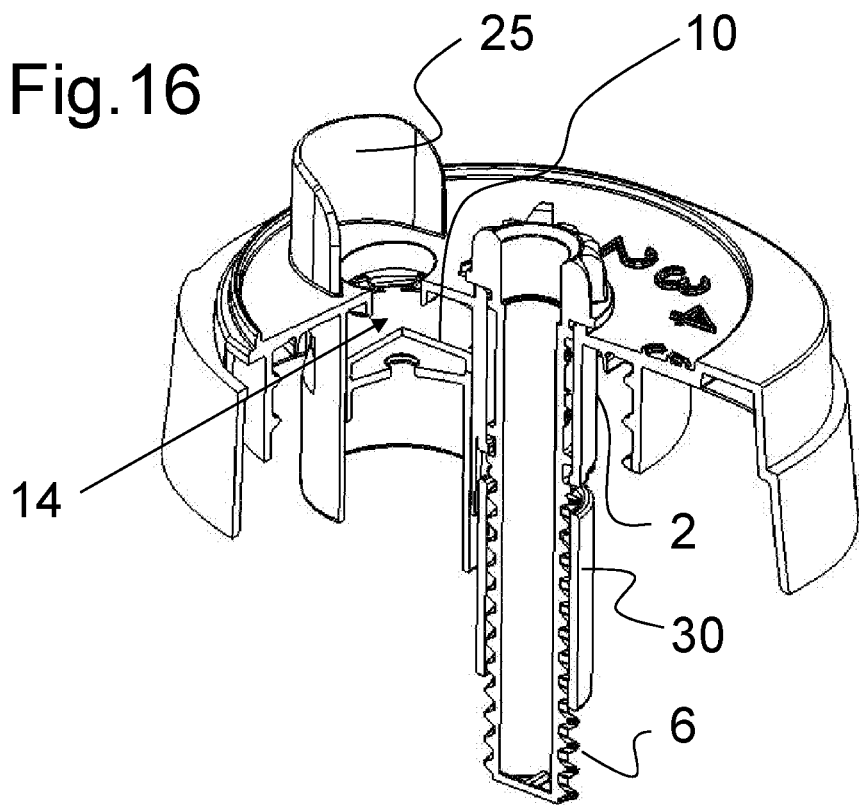
FIG. 16: The assembled dosing device with device for adjusting the dosing quantities in a partial section perspective seen obliquely from above, when setting a minimum dose.
Figure 17:
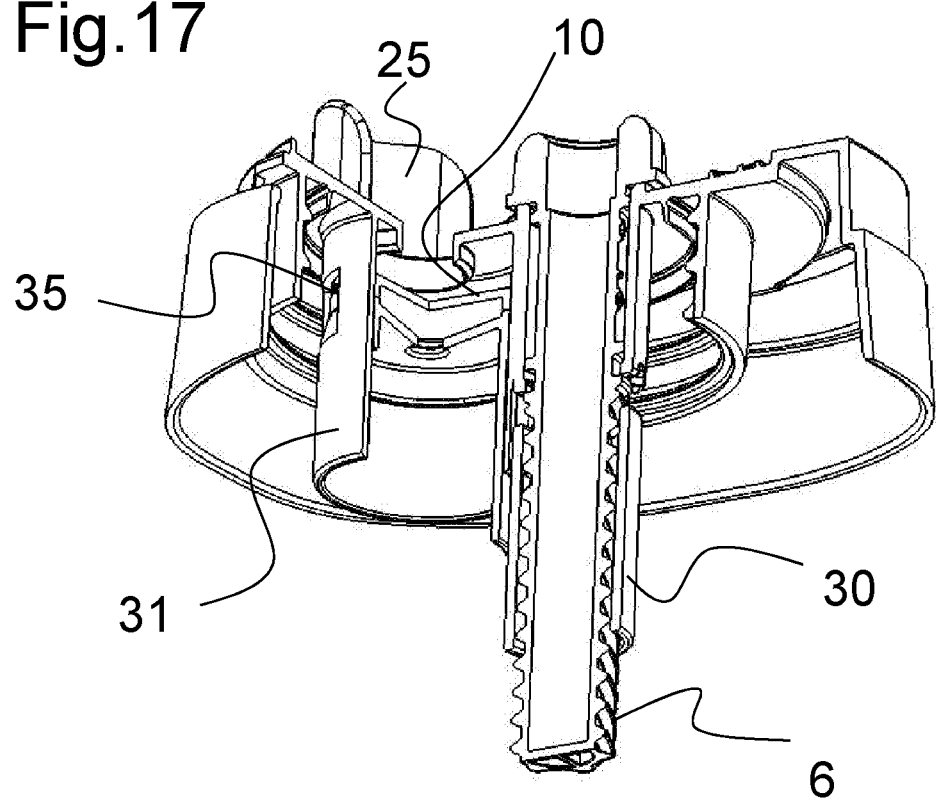
FIG. 17: The assembled dosing device with means for adjusting the dosing quantities in a partial section perspective seen obliquely from below, when setting a minimum dose.

FIG. 16 shows the assembled dosing device with a device for adjusting the dosing quantity again in a partial section perspective view seen obliquely from above. Here, the minimum dose is set, with the adjusting sleeve 30 in its uppermost position, very close to the socket 2 for the spindle 6. The path of the dosing piston 10 in the dosing control chamber 14 is accordingly limited. FIG. 17 shows the same thing in a different perspective, namely obliquely from below.

Figure 18A:
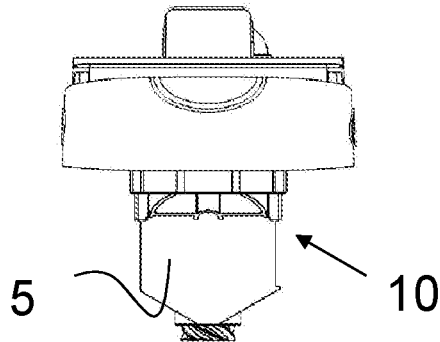
FIG. 18a-c: The dosing device for continuously adjusting the dosing quantity, with setting for a maximum dosing quantity in a) seen from the side, b) seen in a partial section obliquely from above and c) seen in a cross-section from the side.
Figure 19A:
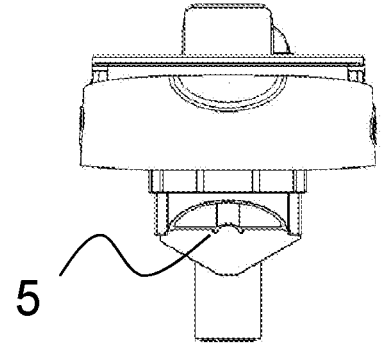
FIG. 19a-c: The dosing device for continuously adjusting the dosing quantity, with setting for a minimum dosing quantity in a) seen from the side, b) seen in a partial section obliquely from above and c) seen in a cross-section from the side.
Figure 18B:
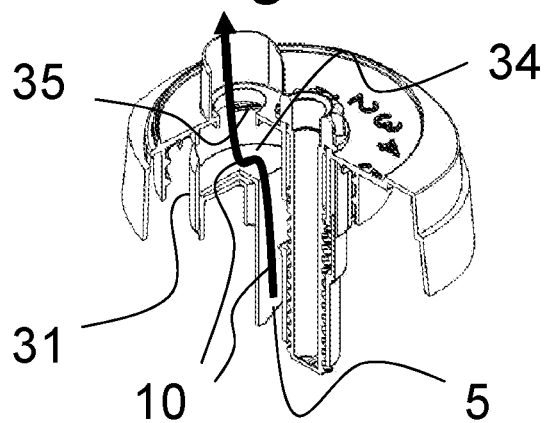
Figure 19B:
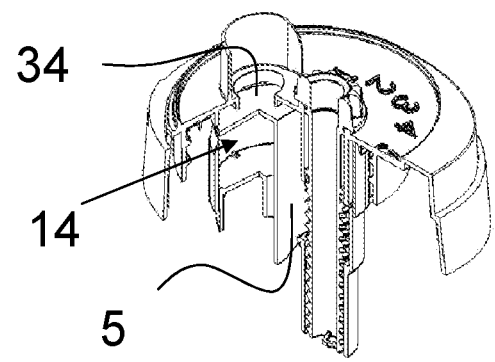
Figure 18C:
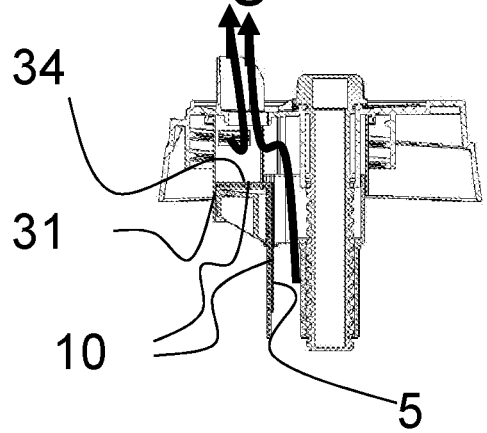
Figure 19C:
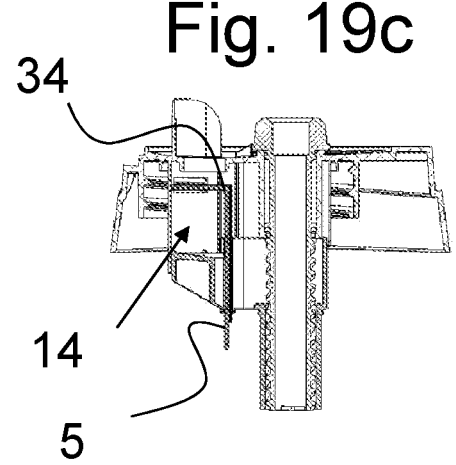

FIG. 18a-c shows the dosing device with a dosing piston 10, which has a boundary wall 5, which is located in a plane axially extending to the dosing device, as well as a boundary wall perpendicularly angled thereto, which forms a semicircular disc 34. The function of this dosing piston was described in detail at the beginning. With the mechanism shown here for adjusting the dosing quantities, the displacement path of the dosing piston 10 is essentially changed in that its downward path is limited, which is achieved by rotating the spindle 6, and thus the height adjustment of the control chamber limiter 31. In FIGS. 18a-c, the dosing piston 10 is shown in its position in which it strikes the bottom of the control chamber limiter 31 with its half circular disk 34. In the case of an inverted container and inverted dosing device, air passes through the ventilation device and ensures pressure equalization in the interior of the container, and pouring starts from this position of the dosing piston 10, with flow along the arrows shown. Liquid from the container may first flow outside along the axial wall 5 of the dosing piston 10, as well as through the windows 35 and then through the spout 3 to the outside until half the circular disc 34 has swept over the windows 35 and the space below, or for the inverted position of the dosing device then accordingly the space above, the circular disc 34 of the dosing piston 10 is filled. During the pouring of a specific dose, therefore, the dosing control chamber 14 is filled, and as soon as it is full, the circular disk 34 closes the spout 3. Using the spindle 6, therefore, the starting position of the circular disc 34 of the dosing piston 10 is adjusted and accordingly the filling volume of the control chamber 14, which as a characterizing feature is filled up rather than emptied during pouring of a dose.

It is understood that the number scale 26 can also be calibrated to the dosing device 26 so that, for example, on a scale of 1 to 9, the corresponding number of 10-ml units of liquid are poured. It is clear that the dose quantities belonging to the numbers are freely selectable, depending on the design and dimensioning of the dosing device. Instead of numbers, any symbols or markings can also be used.

Figure 20:
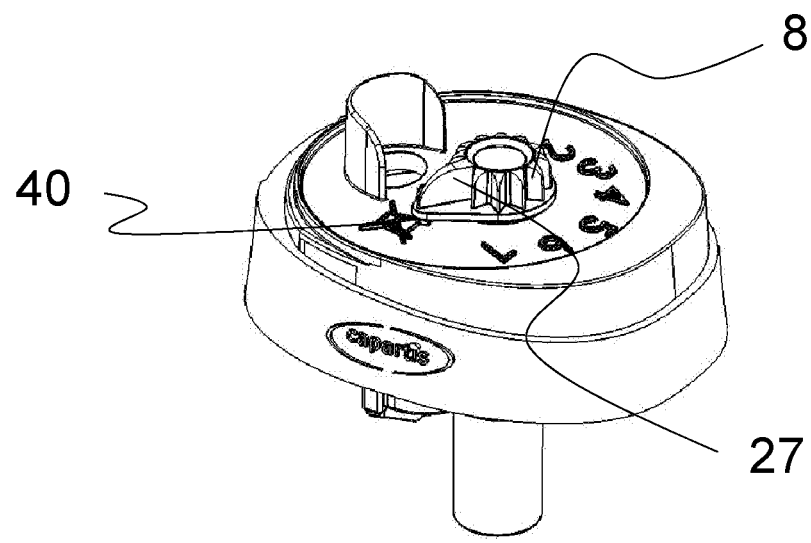
FIG. 20: The dosing device in a diametrical section in a setting in which a continuous outflow is made possible.

A particular embodiment of the dosing device which also allows a continuous outflow is presented below. For this purpose, special marking is applied to the top of the dosing device. In FIG. 20, this special version is seen obliquely from above. For this purpose, the rotary knob 8 is rotated to a special position, where its pointer 27 points to a mark 40, which indicates continuous pouring—or at which there is no dosing, here in the form of a dosing cup, which is marked with a cross.

Figure 21:
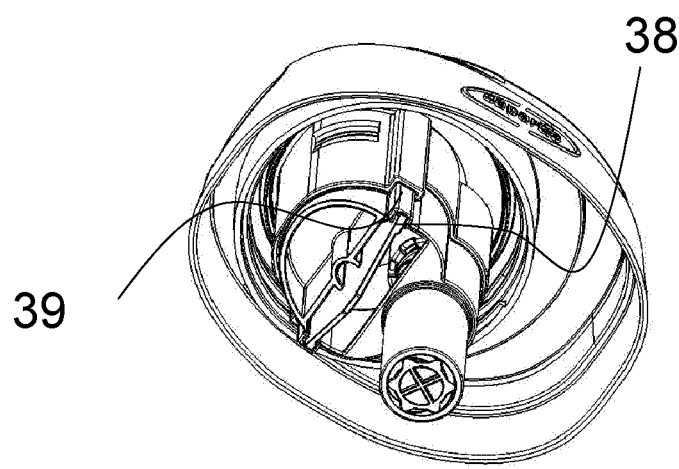
FIG. 21: The dosing device seen obliquely from above, with the setting for a continuous outflow.

FIG. 21 shows the dosing device in this setting for continuous pouring, seen in an oblique view from below. In principle, continuous outflow is realized in that the extension 5 and its lid 15 extending perpendicularly to it can no longer reach the pouring hole due to an activatable travel limit, so that the lid 15 can no longer close the pouring hole and therefore keeps it open. For this purpose, in the shown exemplary embodiment, lugs 38 are formed on both sides of the extension 5, which encounter a stop during upward movement of the extension 5 on a special height-adjustable insert, which is visible in further illustrations. Thus, the extension 5 cannot move far enough up that it closes the outflow. As a result, a continuous outflow is made possible.

Figure 22:
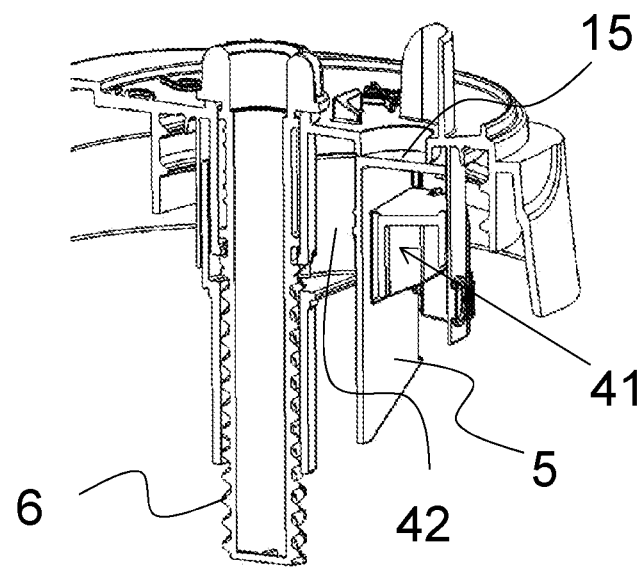
FIG. 22: The dosing device shown in a section along the axis of the spindle for dispensing the smallest possible dose.

How precisely that is realized is revealed on the basis of FIGS. 22 through 25. FIG. 22 shows the dosing device for this purpose in a section along the axis of the spindle 6. On the spindle sits a socket 42 with female thread, which is guided inside the dosing closure in a rotationally fixed manner. When the spindle 6 is rotated, which is triggered by the rotation of the rotary knob 8, the socket 42 is moved up and down. The socket 42 is connected to the insert 41 so that the latter also moves up and down accordingly with the socket 42. The extension 5 with its lateral lugs 38 encounters a stop in its upward movement or during pouring in its downward movement on the insert 41 depending on the setting and stops, thereby limiting the movement of the extension 5. In the illustration shown, a minimum dose to be dispensed is set. The extension 5 can move from the starting position shown here during the pouring, i.e. with an inverted dosing device, downward to the pouring hole. During this movement of the extension 5 and the lid 15 projecting at right angles to it, liquid continuously flows around the extension 5 and above the lid 15 to the pouring hole and outwards until the lid 15 on the extension 5 reaches the pouring hole and closes it. This completes the dosing. For the dispensing of a new dose, the dosing device must be pivoted to an upright position and tilted once again.

Figure 23:
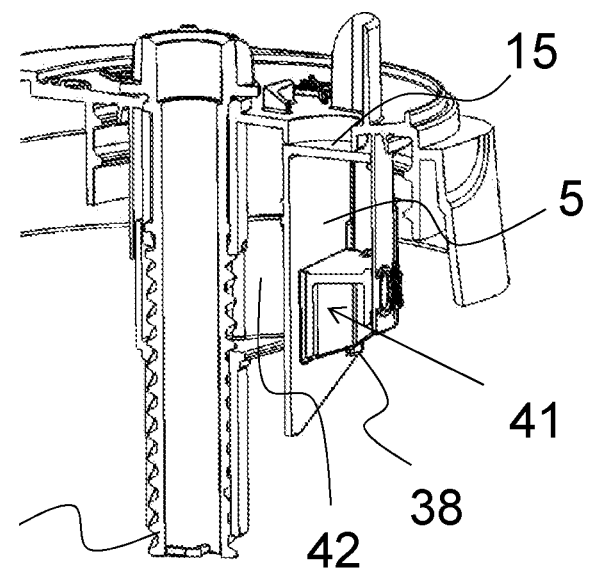
FIG. 23: The dosing device shown in a section along the axis of the spindle, for dispensing the largest possible dose.

FIG. 23 shows the same view of the dosing device, but now with a setting for the greatest possible dispensed dose. The insert was moved by turning the rotary knob 8 and thus the spindle 6 so far downward that a larger path of the extension 5 and its lid 15 is made possible, compared with the setting according to FIG. 22. During pouring, i.e. with a tilted dosing device, the extension 5 and lid 15 in turn move against the pouring hole, while the liquid continuously flows out, until the lid 15 abuts the pouring hole and closes it. The dosing is thereby concluded. For the dispensing of a new dose, the dosing device must be pivoted to an upright position and tilted once again.

Figure 24:
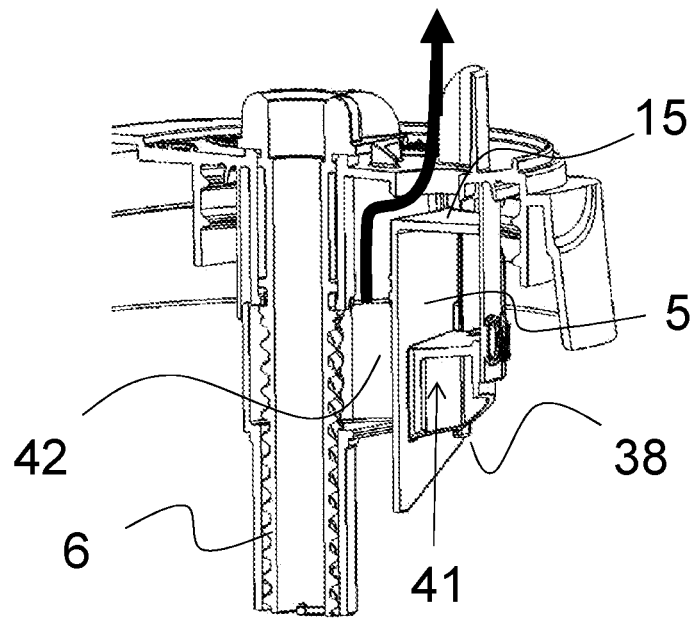
FIG. 24: The dosing device shown in a section along the axis of the spindle, for a continuous outflow.

Finally, FIG. 24 shows a third setting, namely for continuous pouring. The path of the liquid is marked with a thick arrow. The fluid flows around the extension 5 and lid 15 projecting at a right angle to it, and passes through the pouring hole to the outside. The pouring can therefore proceed continuously, because in this setting, the movement of the extension 5 and lid 15 is bounded against the pouring hole. For this purpose, upon rotation of the rotary knob 8 to the position for continuous pouring—as shown in FIG. 20—the spindle 6 is rotated so far that the socket 42 and its connected insert 41 is moved so far down that the extension 5 with its two lateral lugs 38 on this insert 41 encounters a stop early, and cannot move further to the pouring hole. Therefore, there is always a path open for the outflowing liquid. In other words: Due to this holding back of the extension 5 by striking of its lugs 38 on the insert 41, the lid 15 is no longer allowed to move to the pouring hole to the point where it closes the latter. Thus, the pouring hole is left permanently open. Liquid can therefore flow out continuously.

Figure 25:
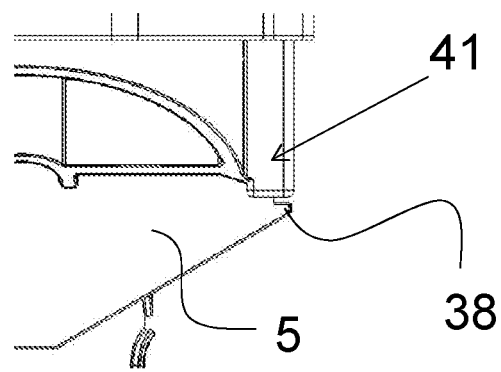
FIG. 25: A detail view of the lower end of the insert and the lug below that, just before its stop.

Finally, FIG. 25 details how one of the two lugs 38 encounters a stop on the insert 41. During pouring, the extension 5 moves towards the insert 41 and as is seen here, in the drawing there is scarcely 1 mm left before the lug 38 strikes the insert 41 and the movement of the extension 5 and the lid 15 is stopped. The extension 5 with its lid 15 then stops in a position in which the lid 15 still holds the pouring hole open, so that liquid can flow out continuously.

LIST OF REFERENCE SIGNS 1 device body
2 spindle socket
3 spout
4 hollow cylindrical cup
5 extension on dosing piston
6 spindle
7 closing cap
8 rotary knob for the spindle 6
9 adjustment element
10 dosing piston
11 level extension on dosing piston
12 window in hollow cylindrical cup, entrance hole
13 lid on the cup
14 control chamber
15 lid on the hollow cylindrical dosing piston 10
16 lateral rib on the dosing piston
17 inclined surface on rib 16
18 rib at the front of the chair-shaped dosing piston
19 chair seat surface
20 chair back
21 space 21 below the dosing piston 10
22 container/bottle
23 inner edge of the spout 3
24 cams as travel limiters
25 beak on spout 3
26 number scale
27 pointers
28 stops for the pointer 27
29 blank section on spindle
30 adjustment sleeve
31 control chamber limiter
32 female thread for the external thread of a container neck
33 threaded sections on adjusting sleeve
34 circular disk
35 window in control chamber limiter
36 Sleeve with female thread 32 for socket of the container
37 Filling hole on the control chamber limiter
38 lug for continuous outflow
39 stop for lug
40 continuous outflow marking for pointers of the rotary knob
41 insert
42 socket for insert

The invention claimed is:

1. A dosing device for a neck for pouring defined doses from a container or hose, consisting of a spout attachment that can be screwed or pushed onto the neck, and that optionally can be closed with a separate lid and has a dosing control chamber (14) with variable volume, which during pouring is filled from empty to full, wherein said dosing control chamber (14) is formed by the space between a control chamber limiter (31) and the interior of a dosing piston (10), and wherein the dosing control chamber (14) is filled when pouring a dose, and wherein the dosing piston (10) closes the spout (3) when the control chamber (14) is full, characterized in that the control chamber limiter (31) is axially displaceable in its position, that the dosing quantities to be poured can be adjusted by the control chamber limited (31) in that the path of the dosing piston (10) can be limited on its side facing the container or hose, in that a spindle (6) is rotatably mounted in the dosing device in an axial spindle socket (2) and has a rotary knob (8) at the top, which at the front sealingly protrudes from the dosing device, and that the spindle (6) thread engages with its end region in the threaded portions (33) inside an adjustment sleeve (30) and the adjustment sleeve (30) is connected outside with a control chamber limiter (31) so that upon rotation of the spindle (6) the control chamber limiter (31) is axially displaceable in its position and thus the position of the dosing piston (10) for starting the pouring of a dose in each setting position may be limited, so that the path of the dosing piston (10) and thus the filling volume of the control chamber (14) is selectable.

2. The dosing device for a neck for dispensing defined doses according to claim 1, wherein the upper outer side of the dosing device is provided with a number or symbol scale (26), and the rotary knob (8) on one side has a radially projecting pointer (27) so that it points to the number or symbol scale (26).

3. The dosing device for a neck for pouring defined doses according to claim 1, wherein the rotary knob (8) is equipped with radial grip ribs.

4. Dosing device for a neck for pouring defined doses according to claim 1, wherein the spout (3), in the dosing device at a peripheral point, has a beak (25) for forming and pouring a liquid stream.

5. The dosing device for a neck for dispensing defined doses according to claim 2, wherein the number or symbol scale (26) indicates a setting of the dosing chamber, in which no dose limitation takes place, that is, the outflow is not interrupted by the dosing device.

6. The dosing device for a neck for pouring defined doses according to claim 2, wherein the number or symbol scale (26) indicates a setting of the dosing chamber, in which the pouring opening is closed, that is, no emptying can take place.

7. The dosing device for a neck for pouring defined doses according to claim 1, wherein the rotary knob (8), or the spindle (6) is hollow, so that it acts as a pressure equalizer during the pouring process and air can flow into the container through it.

8. The dosing device for a neck for dispensing defined doses according to claim 1, wherein the rotary knob (8) or the spindle (6) is provided in an inner hole with a grate or sieve, to ensure that liquid cannot escape to the outside from the air hole during the pouring process.

9. The dosing device for a neck for pouring defined doses according to claim 1, wherein the maximum and the minimum dosing quantity of the dosing device can be varied by enlargement or reduction of an inlet hole (12) on the control chamber limiter (31) while basically keeping the rest of the geometry.

10. The dosing device for a neck for pouring defined doses according to claim 1, wherein the dosing piston (10) includes a downwardly projecting extension (5) where in one setting, the downwardly projecting extension (5) is limited in its path to the spout, so that the lid (15) can no longer close the pouring hole and thus a continuous outflow is guaranteed.

11. The dosing device for a neck for dispensing defined doses according to claim 1, wherein the dosing piston (10) includes a downwardly projecting extension (5) having a lower edge with at least one laterally projecting lug (38) which, in a rotation setting of the rotary knob (8) and the spindle (6) each encounters a stop on an insert (41), which is connected to a socket (42) which sits on the spindle (6) and is fixed in the dosing device against rotation, so that upon rotation of the spindle, the height position of the insert (41) is adjustable and upon abutment of the at least one lug (38) on the insert (41), the downwardly projecting extension (5) is limited in its path to the spout, so that the lid (15) can no longer close it and thus a continuous outflow is ensured.

* * * * *